United States Patent
Oshino et al.

(10) Patent No.: US 11,456,580 B2
(45) Date of Patent: Sep. 27, 2022

(54) WIRE EXTERIOR BODY AND EXTERIOR-COVERED WIRE HARNESS

(71) Applicants: FURUKAWA ELECTRIC CO., LTD., Tokyo (JP); FURUKAWA AUTOMOTIVE SYSTEMS INC., Shiga (JP)

(72) Inventors: Takashi Oshino, Tokyo (JP); Koichi Maeno, Tokyo (JP); Naoyuki Kojima, Tokyo (JP); Hideyuki Ikeda, Tokyo (JP); Yoshikazu Kamei, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 16/970,740

(22) PCT Filed: Jan. 29, 2019

(86) PCT No.: PCT/JP2019/002951
§ 371 (c)(1),
(2) Date: Aug. 18, 2020

(87) PCT Pub. No.: WO2019/159684
PCT Pub. Date: Aug. 22, 2019

(65) Prior Publication Data
US 2021/0021112 A1      Jan. 21, 2021

(30) Foreign Application Priority Data

Feb. 19, 2018   (JP) .............................. JP2018-026658

(51) Int. Cl.
*H02G 3/04*     (2006.01)
*H01B 7/00*     (2006.01)
*H01B 7/24*     (2006.01)

(52) U.S. Cl.
CPC .......... *H02G 3/0437* (2013.01); *H01B 7/0045* (2013.01); *H01B 7/24* (2013.01); *H02G 3/0487* (2013.01)

(58) Field of Classification Search
CPC .......... H02G 3/30; H02G 3/04; H02G 3/0437; H02G 3/0487; H01B 7/0045; H01B 7/24; B26D 3/085; B26D 1/38
See application file for complete search history.

(56) References Cited

U.S. PATENT DOCUMENTS 2,079,274 A  *  5/1937  Baker .................. H02G 3/0487
                                                              174/95
2,134,393 A  *  10/1938  Bennett ................ H02G 3/0487
                                                              52/220.1

(Continued)

FOREIGN PATENT DOCUMENTS

CN       101740880 A       6/2010
CN       204633248 U       9/2015

(Continued)

OTHER PUBLICATIONS

International Search Report, issued in PCT/JP2019/002951, dated Feb. 26, 2019.

(Continued)

*Primary Examiner* — William H. Mayo, III
*Assistant Examiner* — Krystal Robinson
(74) *Attorney, Agent, or Firm* — Birch, Stewart, Kolasch & Birch, LLP

(57) ABSTRACT

A wire exterior body and an exterior-covered wire harness, capable of preventing damage to thereby suppress deterioration in the protective function for electric wires, are provided. A wire exterior body (3) formed of a resin sheet, to be mounted on the outer periphery of the wire harness (2), includes bending portions (20a) to (20d) at which the resin sheet is bent, and a plurality of wall parts (4) formed of the (Continued)

resin sheet bent at the bending portions (20*a*) to (20*d*). The wall parts (4) extend along the extending direction of the electric wires and form an accommodating part (5) that accommodates the electric wires. Grooves (21*a*) to (21*d*) are formed in the bending portions (20*a*) to (20*d*) at positions separated by predetermined spaces (S1) and (S2) from end portions (4*a*) and (4*b*), in the extending direction of the electric wires, of the wall parts (4).

20 Claims, 10 Drawing Sheets

(56) References Cited

U.S. PATENT DOCUMENTS

| | | | | |
|---|---|---|---|---|
| 3,425,889 | A  * | 2/1969 | Willits, Jr. | A47F 5/0815 |
| | | | | 248/220.43 |
| 4,640,032 | A  * | 2/1987 | Lewis | H02G 3/26 |
| | | | | 174/135 |
| 6,209,827 | B1 * | 4/2001 | Kawai | F16B 21/02 |
| | | | | 248/49 |
| 7,145,079 | B1 * | 12/2006 | Henry | H02G 3/0418 |
| | | | | 174/101 |
| 7,318,621 | B2 * | 1/2008 | Suzuki | B60R 16/0215 |
| | | | | 296/1.08 |
| 9,163,698 | B2 | 10/2015 | Kaihotsu et al. | |
| 9,731,665 | B2 * | 8/2017 | Wakabayashi | B60R 16/0215 |
| 10,576,914 | B2 * | 3/2020 | Toyosaka | H02G 3/0418 |
| 10,886,038 | B2 * | 1/2021 | Mizuno | H01B 7/0045 |
| 2005/0280288 | A1 * | 12/2005 | Suzuki | B60R 16/0215 |
| | | | | 296/208 |
| 2006/0175086 | A1 * | 8/2006 | Makwinski | H02G 3/105 |
| | | | | 174/480 |
| 2007/0056763 | A1 * | 3/2007 | Kelly | B65D 81/36 |
| | | | | 174/135 |
| 2008/0017397 | A1 * | 1/2008 | Komiya | F16G 13/16 |
| | | | | 174/24 |
| 2014/0262421 | A1 * | 9/2014 | Kaihotsu | H01B 17/58 |
| | | | | 174/68.3 |
| 2014/0305697 | A1 * | 10/2014 | Hudson | H02G 1/06 |
| | | | | 174/72 A |
| 2016/0019998 | A1 * | 1/2016 | Kawaguchi | H01B 13/01281 |
| | | | | 174/72 A |
| 2016/0156165 | A1 * | 6/2016 | Katou | H02G 3/26 |
| | | | | 174/72 A |
| 2016/0280157 | A1 | 9/2016 | Katou et al. | |
| 2017/0331263 | A1 | 11/2017 | Matsumura et al. | |

FOREIGN PATENT DOCUMENTS

| | | |
|---|---|---|
| CN | 105359362 A | 2/2016 |
| CN | 105474488 A | 4/2016 |
| JP | 8-196016 A | 7/1996 |
| JP | 8-317526 A | 11/1996 |
| JP | 10-191529 A | 7/1998 |
| JP | 2010-166750 A | 7/2010 |
| JP | 2015-126667 A | 7/2015 |
| JP | 2016-119785 A | 6/2016 |
| JP | 2017-60253 A | 3/2017 |
| WO | WO 2015/001921 A1 | 1/2015 |
| WO | WO 2015/115164 A1 | 8/2015 |

OTHER PUBLICATIONS

Written Opinion of the international Searching Authority, issued in PCT/JP2019/002951, dated Feb. 26, 2019.
International Preliminary Report on Patentability and English translation of the Written Opinion of the International Searching Authority (PCT/IB/338, PCT/IB/373 and PCT/ISA/237) dated Sep. 3, 2020 for Application No. PCT/JP2019/002951.
Chinese Office Action and Search Report for Chinese Application No. 201980014233.8, dated Mar. 2, 2021, with an English translation.
Chinese Office Action and Search Report for Chinese Application No. 201980014233.8. dated Dec. 3, 2021, with an English translation.
Japanese Office Action for corresponding Japanese Application No. 2020-500377, dated Aug. 3, 2022, including an English translation.

* cited by examiner

WIRE EXTERIOR BODY AND EXTERIOR-COVERED WIRE HARNESS

TECHNICAL FIELD

The present disclosure relates to a wire exterior body to be mounted on the outer periphery of an electrical wire, and an exterior-covered wire harness.

BACKGROUND ART

Conventionally, as a wire exterior body to be mounted on the outer periphery of an electric wire to be routed in a vehicle or the like, a protector for protecting a wire bundle from the outside has been known. In such a protector, a hollow plate member in which a hollow structure is formed between two plate-shaped members is bent into a tubular shape to accommodate the wire bundle in the tubular interior thereof (see Patent Literature 1).

In the protector, a folding portion is formed by a notch provided from one end to another end in the circumferential direction in each of the plate-shaped members, and the plate-shaped member is folded along the folding portion to be assembled.

DOCUMENT LIST

Patent Literature

Patent Literature 1: Japanese Patent Application Publication No. 2015-126667

SUMMARY OF DISCLOSURE

Technical Problem

However, the conventional protector described above has a problem that when the protector is mounted on a vehicle body or the like or if stress is applied to the bent part due to vibration or the like when the vehicle is travelling or the like, the plate member is broken along the bent part so that the protector is damaged, whereby the protective function for the electric wires deteriorates.

The present disclosure has been made in view of the aforementioned problem, and it is an object of the present disclosure to provide a wire exterior body and an exterior-covered wire harness in which deterioration in the protective function for the electric wires can be suppressed by preventing damage.

Solution to Problem

In order to achieve the aforementioned object, a wire exterior body of the present disclosure is a wire exterior body, formed of a resin sheet, to be mounted on an outer periphery of an electric wire. The wire exterior body includes a bending portion at which the resin sheet is bent, and a plurality of wall parts formed of the resin sheet bent at the bending portion. The wall parts extend along an extending direction of the electric wire, and form an accommodating part that accommodates the electric wire. A groove is formed in the bending portion at a position separated by a predetermined space from an end portion, in the extending direction of the electric wire, of the wall parts.

In the wire exterior body according to one aspect of the present disclosure, the plurality of the walls include a branch portion and/or a bent portion in the extending direction of the electric wire, and at least one wall part of the plurality of the wall parts is divided at the branch portion and/or the bent portion, and the groove is formed in the bending portion at a position separated by a predetermined space from a division end at which the at least one wall part is divided.

In the wire exterior body according to one aspect of the present disclosure, the predetermined space is 1 mm or more and 10 mm or less.

In the wire exterior body according to one aspect of the present disclosure, the groove is formed in a linear shape or an almost linear shape along the extending direction of the electric wire.

In the wire exterior body according to one aspect of the present disclosure, a depth of the groove is 30% or more and 80% or less of a thickness of the resin sheet.

In the wire exterior body according to one aspect of the present disclosure, a density of the resin sheet in the groove is higher than a density of the resin sheet except for the groove in an upper surface and a lower surface facing a thickness direction of the resin sheet, and is 400 Kg/m$^3$ or more and 1200 Kg/m$^3$ or less.

In the wire exterior body according to one aspect of the present disclosure, the bending portion at the position separated by the predetermined space from the end portion, in the extending direction of the electric wire, of the wall part and the bending portion at a position in the predetermined space from the end portion in the extending direction of the electric wire have different heights in a thickness direction of the resin sheet.

In order to achieve the aforementioned object, an exterior-covered wire harness of the present disclosure includes a wire harness and the wire exterior body, and the wire exterior body is mounted on an outer periphery of the wire harness.

Effects of Disclosure

According to the wire exterior body and the exterior-covered wire harness of the present disclosure, it is possible to prevent damage to thereby suppress deterioration in the protective function for the electric wires.

DESCRIPTION OF EMBODIMENTS

Hereinafter, embodiments of the present disclosure will be specifically described with reference to the drawings.

Figure 1:
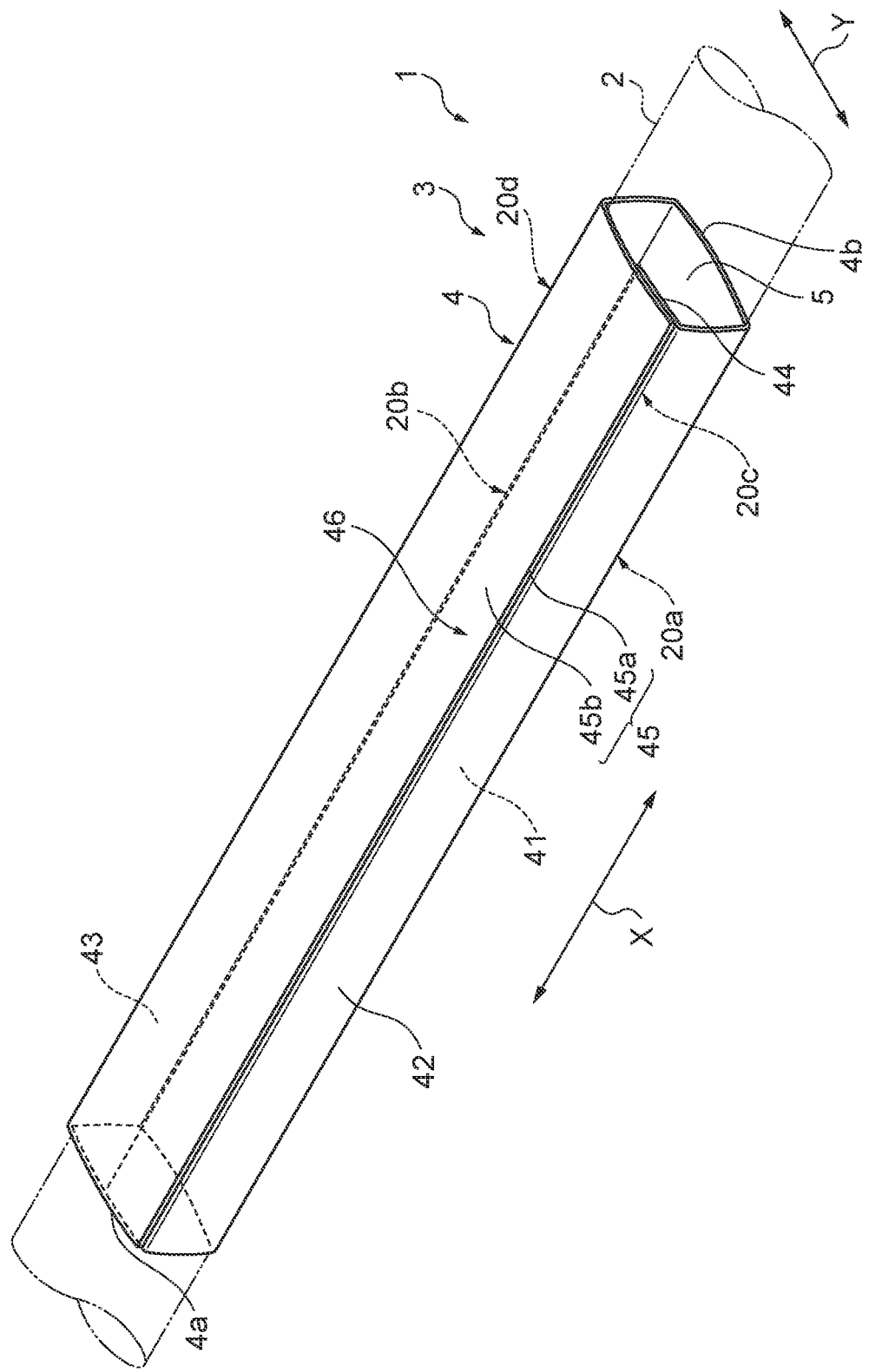
FIG. 1 A perspective view showing an exterior body and an exterior-covered wire harness of a first embodiment of the present disclosure.

First, a first embodiment of the present disclosure will be described with reference to FIGS. 1 to 4. First, a configuration of an exterior-covered wire harness according to the first embodiment of the present disclosure will be described with reference to FIG. 1. FIG. 1 is a perspective view showing an exterior body 3 and an exterior-covered wire harness 1 of the first embodiment of the present disclosure.

Note that in the first embodiment of the present disclosure, a longitudinal direction (length direction) of the exterior body 3 is assumed to be "X" and a short direction (width direction) of the exterior body 3 is assumed to be "Y" for convenience of description.

As shown in FIG. 1, the exterior-covered wire harness 1 of the first embodiment of the present disclosure includes a wire harness 2 in which a plurality of electric wires are bundled, and a wire exterior body (hereinafter, also referred to as "exterior body") 3 to be mounted on the outer periphery of the wire harness 2. The wire harness 2 is protected from the external environment by the exterior body 3. Note that in FIG. 1, while the wire harness 2 is shown in one columnar shape, the wire harness 2 is one including one or more electric wires.

Figure 2:
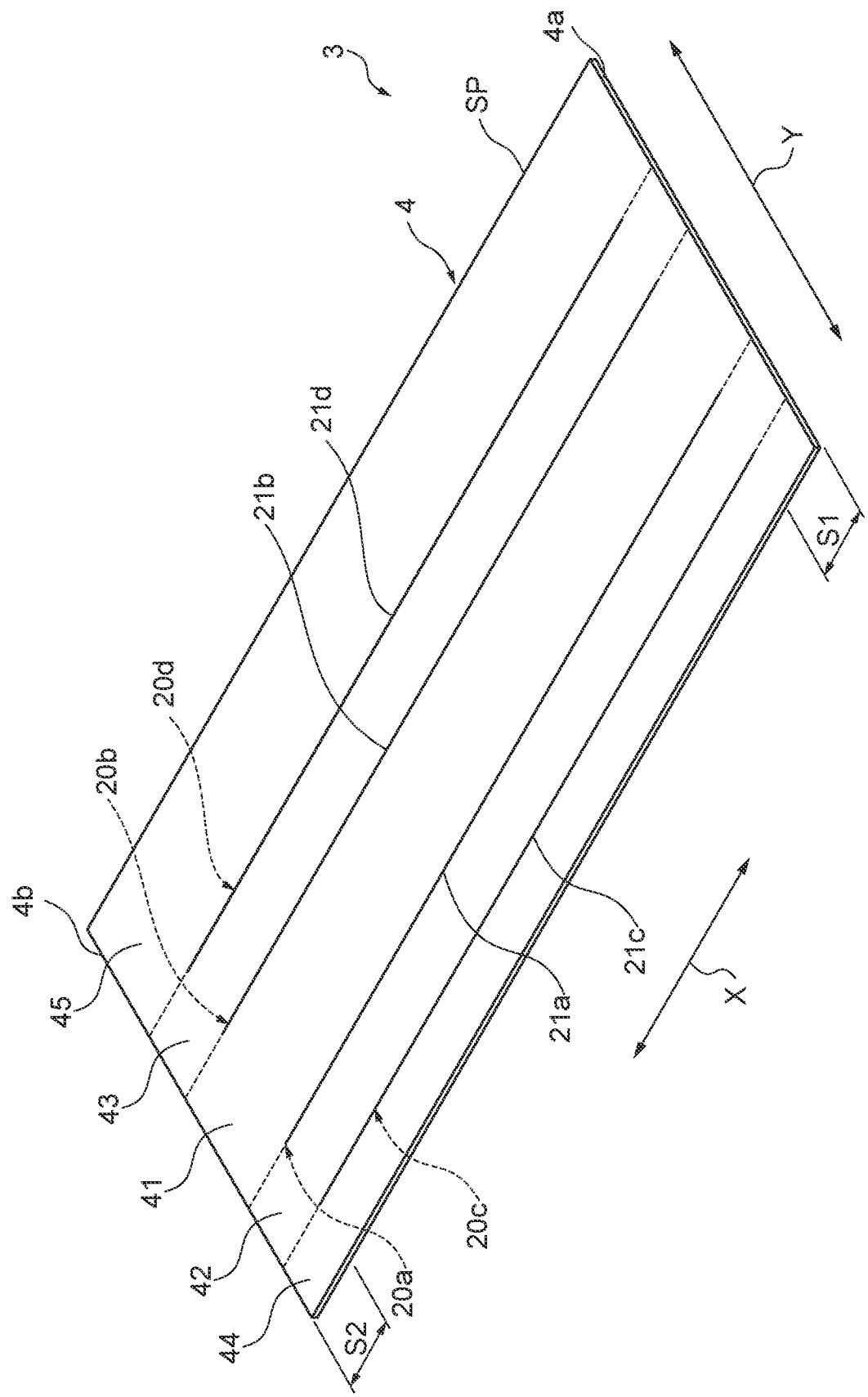
FIG. 2 A perspective view showing the exterior body, in a developed state, of the first embodiment of the present disclosure.

Next, the exterior body 3 of the first embodiment of the present disclosure will be described with referent to FIGS. 1 and 2. FIG. 2 is a perspective view illustrating the exterior body 3, shown in FIG. 1, in a developed state. Note that FIG. 2 shows a state where the outer surface of the exterior body 3 shown in FIG. 1 is developed.

As shown in FIG. 1, the exterior body 3 includes a plurality of wall parts 4 extending along the extending direction (longitudinal direction X) of the wire harness (electric wire) 2. The space formed by being surrounded by the wall parts 4 forms an accommodating part 5 that accommodates the wire harness 2. The exterior body 3 has a cross section in which the shape in the short direction Y is a rectangular shape or a substantially rectangular shape.

As shown in FIG. 2, the wall parts 4 are integrally formed of one resin sheet (for example, thermoplastic resin foamed sheet) SP that is bent at bending portions 20a to 20d. That is, the resin sheet SP is bent at bending portions 20a to 20d to form the wall parts 4.

The wall parts 4 include a bottom wall part 41, a side wall part 42 provided continuously from an edge of the bottom wall part 41 via the bending portion 20a, a side wall part 43 provided continuously from an edge of the bottom wall part 41 via the bending portion 20b, an inner lid wall part 44 provided continuously from an edge of the side wall part 42 via the bending portion 20c, and an outer lid wall part 45 provided continuously from an edge of the side wall part 43 via the bending portion 20d.

As shown in FIG. 1, the bottom wall part 41 is disposed between the side wall part 42 and the side wall part 43, the side wall part 42 is erected from an edge of the bottom wall part 41 via the bending portion 20a, and the side wall part 43 is erected from an edge of the bottom wall part 41 via the bending portion 20b.

The inner lid wall part 44 and the outer lid wall part 45 overlap each other in the outer peripheral direction (short direction Y in FIG. 1) of the wire harness 2, and the overlapping portion forms a wall-surface overlapping portion 46. Specifically, the wall-surface overlapping portion 46 is a portion in which an end portion 45b from an edge 45a to the vicinity of the center in the short direction Y of the outer lid wall part 45 overlaps the inner lid wall part 44 from the above. In the wall-surface overlapping portion 46, the inner lid wall part 44 and the outer lid wall part 45 are joined by a joining means. Note that the joining means may include an adhering means such as an adhesive and an adhesive tape, a welding means such as ultrasonic welding and heat welding, a fitting means using a locking member, a rivet, or the like, a penetration fixing means using a stapler or the like, for example.

The inner lid wall part 44 is disposed parallel or almost parallel to the bottom wall part 41 from an edge of the side wall part 42 via the bending portion 20c, and is disposed inside (accommodating part 5 side) in the overlapping portion 46.

The outer lid wall part 45 faces the bottom wall part 41, is disposed parallel or almost parallel to the bottom wall part 41 from an edge of the side wall part 43 via the bending portion 20d, and is disposed outside the overlapping portion 46. The outer lid wall part 45 is disposed such that the edge 45a is almost flush with the side wall part 42 in a state of being disposed on the upper side of the inner lid wall part 44.

As shown in FIG. 2, the bending portions 20a to 20d have grooves 21a to 21d respectively in which the thickness of the resin sheet SP is reduced. The grooves 21a to 21d are half-cut portions in which notches are formed along the bending portions 20a to 20d, respectively.

The grooves 21a to 21d are respectively formed in a linear shape or an almost linear shape along the bending portions 20a to 20d at a position separated by a space S1 from one end portion 4a and by a space S2 from another end portion 4b of the wall part 4, in the extending direction (longitudinal direction X) of the electric wire.

Specifically, the groove 21a is formed in the bending portion 20a except for the bending portion 20a in the space S1 and the space S2. The groove 21b is formed in the bending portion 20b excluding the bending portion 20b in the space S1 and the space S2. The groove 21c is formed in the bending portion 20c excluding the bending portion 20c in the space S1 and the space S2. The groove 21d is formed in the bending portion 20d excluding the bending portion 20d in the space S1 and the space S2. That is, the grooves 21a to 21d are not formed in the bending portions 20a to 20d in the space S1 and the bending portions 20a to 20d in the space S2.

From the viewpoint of achieving bending processability of the bending portions 20a to 20d while suppressing breakage of the resin sheet SP from the bending portions 20a to 20d when stress is applied to the bending portions 20a to 20d, it is preferable that the space S1 and the space S2 each have 1 mm or more and 10 mm or less, and it is more preferable that the space S1 and the space S2 range from 2 mm to 5 mm.

From the viewpoint of suppressing breakage of the resin sheet SP and achieving bending processability of the bending portions 20a to 20d, it is preferable that the depth of the grooves 21a to 21d is 30% or more and 80% or less of the thickness of the resin sheet SP.

The accommodating part 5 is formed in a cylindrical shape in which one end portion 4a and the other end portion 4b of the wall part 4 penetrate, by the bottom wall part 41, the side wall parts 42 and 43, the inner lid wall part 44, and the outer lid wall part 45. A cross sectional shape in the short direction Y of the accommodating part 5 is a rectangular shape or a substantially rectangular shape. Further, the cross-sectional area in the short direction Y of the accommodating part 5 is the same or almost the same anywhere in the longitudinal direction X.

Next, a method of forming the exterior body 3 described above and a method of forming the exterior-covered wire harness 1 by mounting the wire harness 2 on the exterior body 3 will be described with reference to FIGS. 1 and 2.

In the method of forming the exterior body 3, first, stamping is performed to stamp out a portion corresponding to the exterior body 3 from the resin sheet SP serving as a base material for forming the exterior body 3. As stamping, for example, stamping using a Thomson blade mold can be considered from the viewpoint of cost reduction and easy processing.

Further, in the stamped-out portion corresponding to the exterior body 3, half-cut molding is performed on the portions corresponding to the grooves 21a to 21d. Through the half-cut molding, the grooves 21a to 21d are formed, and good bending processability is provided to the bending portions 20a to 20d, whereby the accuracy in the bending positions is improved.

In the method of mounting the exterior body 3, formed as described above, on the wire harness 2, first, the exterior body 3 is bent at the bending portions 20a and 20b such that the side wall parts 42 and 43 become almost perpendicular to the bottom wall part 41. When the bending portions 20a and 20b are bent, the space between the side wall part 42 and the side wall part 43 opens upward along the longitudinal direction X.

After the bending portions 20a and 20b are bent, the wire harness 2 is placed on the bottom wall part 41, and the bending portion 20c is bent such that the inner lid wall part 44 becomes almost parallel to the bottom wall part 41. Thereafter, the bending portion 20d is bent such that the outer lid wall part 45 becomes almost parallel to the bottom wall part 41. When the outer lid wall part 45 is bent at the bending portion 20d, the inner lid wall part 44 and the outer lid wall part 45 overlap each other to form the wall-surface overlapping portion 46. Further, the opening between the side wall part 42 and the side wall part 43 is closed to form the accommodating part 5, and the wire harness 2 is accommodated in the accommodating part 5 in an inserted state. In the wall-surface overlapping portion 46, the inner lid wall part 44 and the outer lid wall part 45 are joined to each other, whereby a state where the opening between the side wall part 42 and the side wall part 43 is closed is fixed, so that the exterior body 3 is mounted on the outer periphery of the wire harness 2.

Note that the exterior body 3 may be mounted on the outer periphery of a fixing tape for fixing a plurality of electric wires forming the wire harness 2 for preventing the electric wires from falling apart, or may be mounted on the outer peripheries of a plurality of electric wires not using a fixing tape. Alternatively, the exterior body 3 may be mounted on the outer periphery of one electric wire.

As described above, according to the exterior body 3 and the exterior-covered wire harness 1 according to the first embodiment of the present disclosure, the grooves 21a to 21d are formed from a position separated by the space S1 from the one end portion 4a of the wall part 4 up to a position separated by the space S2 from the other end portion 4b of the wall part 4. Therefore, even if stress is applied to the bending portions 20a to 20d, it is possible to suppress the resin sheet SP from being torn and broken. That is, in the exterior body 3 and the exterior-covered wire harness 1, the grooves 21a to 21d are not formed in the end portions 4a and 4b of the wall part 4 from which the resin sheet SP is to be torn when stress is applied to the bending portions 20a to 20d. Therefore, it is possible to suppress breakage of the exterior body 3 and the exterior-covered wire harness 1 that may be caused when the resin sheet SP is torn to thereby suppress deterioration in the protective function for the wire harness 2.

The resin sheet SP to be used for the exterior body 3 is not particularly limited if it can be bent. As a resin type, either thermoplastic resin or thermosetting resin can be used. Among them, a thermoplastic resin foamed sheet is preferable from the viewpoint of light weight, freedom in shape design, cost, and the like. The resin type of the thermoplastic resin foamed sheet is not particularly limited, and includes, for example, polyethylene resin, polypropylene resin, polycarbonate resin, polyethylene terephthalate resin, polybutylene terephthalate resin, polyamide resin, polyphenylene sulfide resin, polystyrene resin, polyvinyl chloride resin, polyvinyl acetate resin, polytetrafluoroethylene resin, acrylic resin, or the like.

The density of the thermoplastic resin foamed sheet to be used for the exterior body 3 is not particularly limited. For example, from the viewpoint of improving the balance between light weight and mechanical strength, it is preferable that the density is 200 $Kg/m^3$ or more and 700 $Kg/m^3$ or less, and it is more preferable that the density is 300 $Kg/m^3$ or more and 600 $Kg/m^3$ or less, and it is particularly preferable that the density is 350 $Kg/m^3$ or more and 550 $Kg/m^3$ or less. Note that the density of the thermoplastic resin foamed sheet is measured on the basis of JIS K 7222.

The thickness of the thermoplastic resin foamed sheet is not particularly limited. From the viewpoint of bending easiness and mechanical strength, it is preferable that the thickness is 0.50 mm or more and 4.0 mm or less, and it is more preferable that the thickness is 0.8 mm or more and 2.5 mm or less.

Further, in the thermoplastic resin foamed sheet, a non-foam layer may be formed on both surfaces or either surface. That is, the thermoplastic resin foamed sheet may be formed to include a foam layer and a non-foam layer formed on the foam layer. When a non-foam layer is formed on a surface of the thermoplastic resin foamed sheet, the mechanical strength of the exterior body 3 is enhanced, and the protective performance for the wire harness 2 to be accommodated is improved. From the viewpoint of reliably enhancing the mechanical strength of the exterior body 3, it is preferable to form non-foam layers on both surfaces. The thickness of the non-form layer is not particularly limited and, for example, the thickness may be 10 μm or more and 100 μm or less.

The Shore hardness (HSC) of the thermoplastic resin foamed sheet is not particularly limited, but it is preferable that HSC is 60 or more and 100 or less from the viewpoint of mechanical strength.

Next, the strength of the grooves 21a to 21d of the exterior body 3 will be described with reference to FIGS. 3 and 4. Specifically, a tensile test was performed on resin sheets to be used for the exterior body 3 of the first embodiment of the present disclosure and a resin sheet to be used for a comparative example, and a change in the resin sheet tear strength was evaluated. Moreover, the bending processability of the resin sheets of the first embodiment of the present disclosure and that of the resin sheet of the comparative example were also evaluated. The evaluation results will be described.

Figure 3:
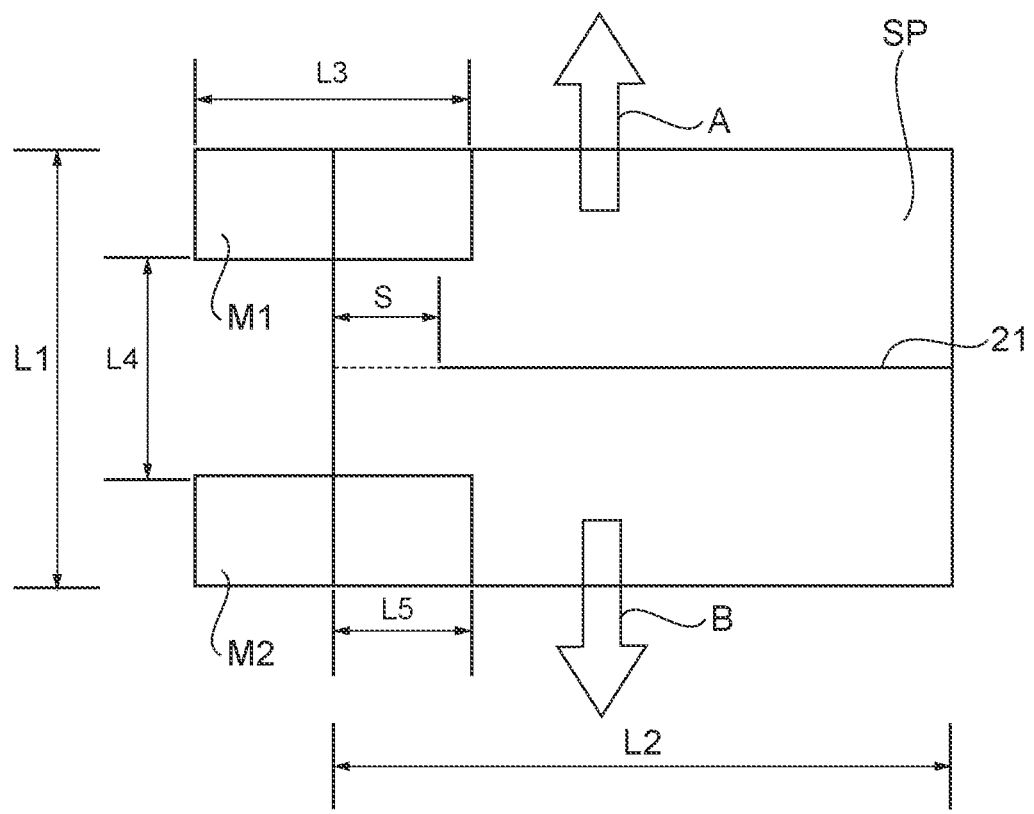
FIG. 3 A view for showing a resin sheet to be used in a tear test of the exterior body of the first embodiment of the present disclosure.
Figure 4:
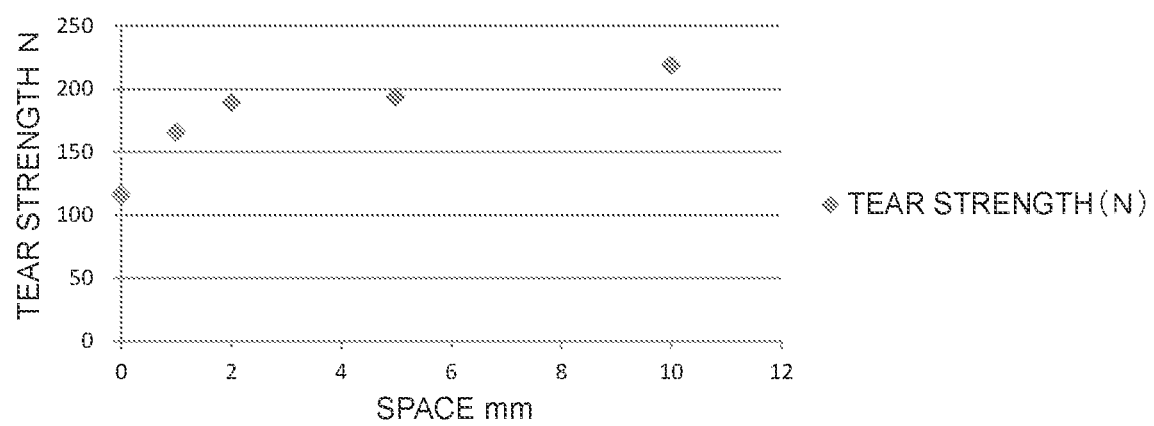
FIG. 4 A graph for showing a relationship between a space in the exterior body and the tear strength of the first embodiment of the present disclosure.

As illustrated in FIG. 3, the tensile test was performed on the resin sheets SP having a vertical length L1 of 40 mm, a horizontal length L2 of 50 mm, and a thickness 1.5 mm, by changing the length (space S) where no groove 21 is formed. Specifically, as a resin sheet corresponding to the resin sheet in which the grooves 21a to 21d are formed in the space S1 and the space S2 as described above, the test was performed on a resin sheet (Comparative Example 1) SP on which a groove 21 is formed from one end portion to another end portion of the resin sheet, that is, a resin sheet SP in which the space S is 0 mm. Further, as a resin sheet to be used for the exterior body 3 of the first embodiment of the present disclosure described above, that is, as a resin sheet in which the grooves 21a to 21d are not formed in the bending portions 20a to 20d in the space S1 and the space S2, the test was performed on resin sheets SP (Examples 1 to 4) in each of which a groove was formed in a portion excluding a predetermined space from one end portion of the resin sheet.

The resin sheets SP of Examples 1 to 4 are resin sheets in which the spaces S with no groove 21 from one end portion differ from each other. Example 1 is a resin sheet SP in which the space S with no groove 21 is 1 mm. Example 2 is a resin sheet SP in which the space S with no groove 21 is 2 mm. Example 3 is a resin sheet SP in which the space S with no groove 21 is 5 mm. Example 4 is a resin sheet SP in which the space S with no groove 21 is 10 mm.

Tensile test was performed such that three resin sheets SP were produced for each of Examples 1 to 4, and an end portion of the space S side of each of the produced resin sheets SP was fixed to a jig M1 and a jig M2. The jig M1 and the jig M2 were jigs each having a width L3 of 25 mm, and were arranged to have a distance L4 of 20 mm from each other in a direction orthogonal to the groove 21 on the resin sheet SP. To the jig M1 and the jig M2, the resin sheet SP was fixed such that a width L5 of holding the resin sheet SP was 12.5 mm. Then, the jig M1 and the jig M2 were pulled in opposite directions (arrow A direction and arrow B direction) in a rate of 50 mm/minute, and a maximum strength when the resin sheet SP was torn (hereinafter, also referred to as "tear strength") was measured. Further, an average value of the tear strength in each of Comparative Example 1 and Examples 1 to 4 was calculated, and a change in the tear strength with respect to a difference in the space S was evaluated. FIG. 4 shows a relationship between the space S with no groove 21 and the tear strength.

Evaluation of the bending processability was performed in such a manner that three resin sheets SP (thickness: 1.5 mm, depth of groove 21: 1.2 mm) were produced for each of Comparative Example 1 and Examples 1 to 4, the produced resin sheet was bent at the groove 21 by 180 degrees and the state was maintained five seconds, and then released, and the open angle was measured thirty seconds later. Table 1 shows average values of tear strength and evaluation results of the bending processability of Comparative Example 1 and Examples 1 to 4. Note that the bending processability is shown in such a manner that when an open angle thirty seconds after the release was less than 95 degrees, the bending processability is "excellent", when the opened angle was 95 degrees or more and less than 105 degrees, the bending processability is "good", and when the open angle was 105 degrees or more, the bending processability is "fair".

TABLE 1

| | SPACE(mm) | TEAR STRENGTH(N) | BENDING PROCESSABILITY |
|---|---|---|---|
| COMPARATIVE EXAMPLE 1 | 0 | 116.1 | ⊚ |
| EXAMPLE 1 | 1 | 165.8 | ⊚ |
| EXAMPLE 2 | 2 | 189.1 | ⊚ |
| EXAMPLE 3 | 5 | 194.3 | ○ |
| EXAMPLE 4 | 10 | 219.3 | △ |

As shown in Table 1, average values of the tear strength were as follows: in the resin sheet SP of Comparative Example 1, the tear strength was 116.1 N, in the resin sheet SP of Example 1, the tear strength was 165.8 N, in the resin sheet SP of Example 2, the tear strength was 189.1 N, in the resin sheet SP of Example 3, the tear strength is 194.3 N, and in the resin sheet SP of Example 4, the tear strength was 219.3 N. Further, as shown in FIG. 4, it was found the as the space with no groove 21 is larger, the tear strength is stronger. In particular, it was found that a change in the tear strength is large in the case where the space S with no groove 21 was in a range between 0 mm or larger and 2 mm or smaller.

Regarding the bending processability, as shown in Table 1, the resin sheet SP of Comparative Example 1, the resin sheet SP of Example 1, and the resin sheet SP of Example 2 were evaluated to be "bending processability: excellent". On the other hand, the resin sheet of Example 3 was evaluated to be "bending processability: good", because the open angle after the bending was slightly large. The resin sheet SP of Example 4 was evaluated to be "bending processability: fair", because the open angle after the bending was larger.

As described above, the resin sheets SP of Examples 1 to 4 each having no groove from one end portion are evaluated that the tear strength is high and that they are excellent as exterior bodies. Therefore, the exterior body 3 of the first embodiment of the present disclosure in which the grooves 21a to 21d are not formed in the space S1 and the space S2 is evaluated as an excellent exterior body to be mounted on the outer periphery of the wire harness 2. On the other hand, in the resin sheet SP of Example 3 and the resin sheet SP of Example 4, that is, in the resin sheets in each of which a space with no groove is 10 mm or larger, since the open angle after the bending is 105 degrees or larger, it is found that the bending processability thereof tends to be slightly low. Therefore, from the viewpoint of achieving bending processability of the bending portions 20a to 20d, it is preferable that the space S1 and the space S2 range from 2 mm to 5 mm.

Figure 5:
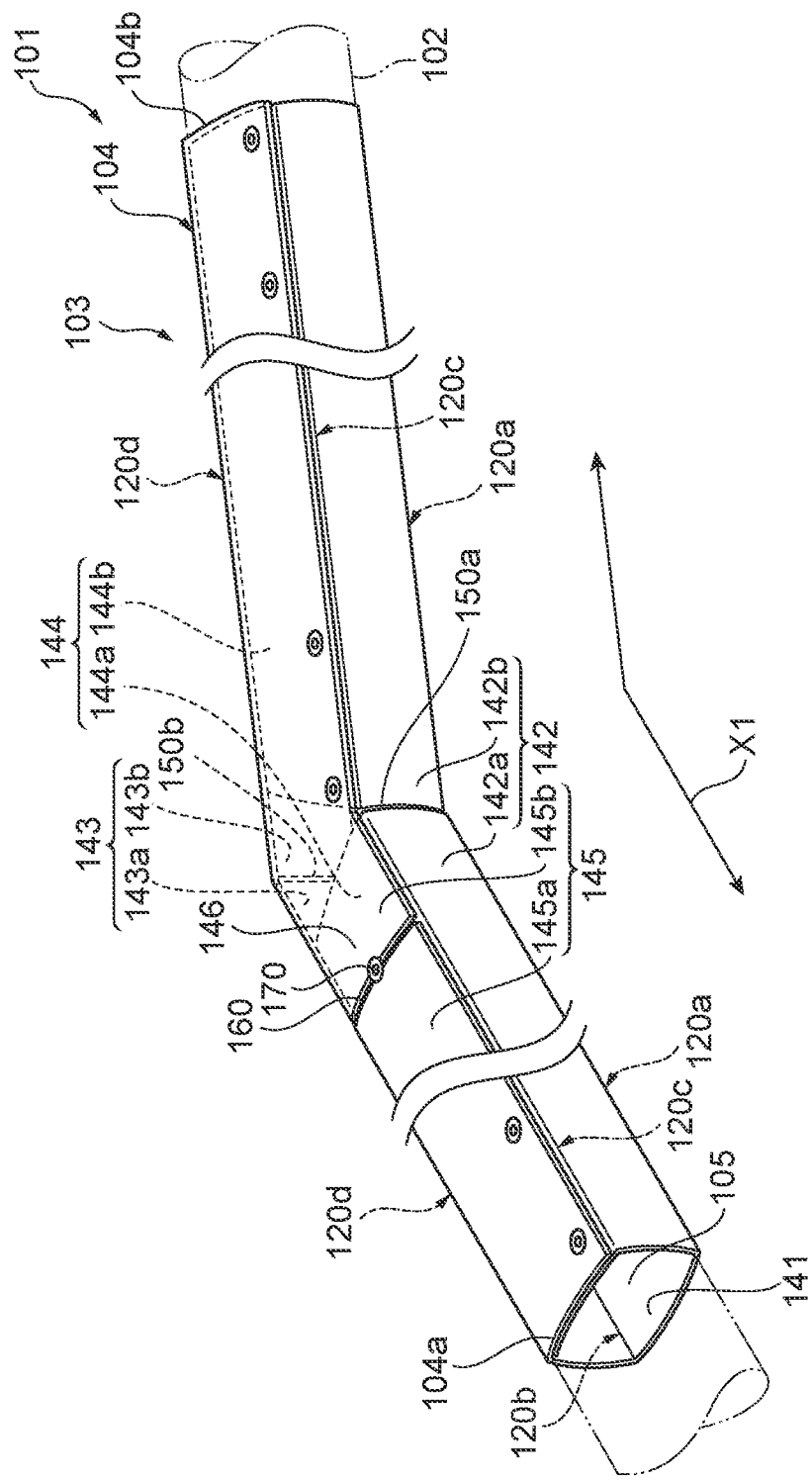
FIG. 5 A perspective view showing an exterior body and an exterior-covered wire harness of a second embodiment of the present disclosure.

Thereafter, a second embodiment of the present disclosure will be described with reference to FIGS. 5 to 7. First, a configuration of an exterior-covered wire harness according to the second embodiment of the present disclosure will be described with reference to FIG. 5. FIG. 5 is a perspective view showing an exterior body 103 and an exterior-covered wire harness 101 of the second embodiment of the present disclosure.

Note that the exterior body 103 and the exterior-covered wire harness 101 of the second embodiment of the present disclosure are ones in which bent portions are formed in the wall part 4 corresponding to the fact that the wire harness is routed by being bent in the exterior body 3 and the exterior-covered wire harness 1 of the first embodiment of the present disclosure. The configurations of the other parts are the same. Therefore, hereinafter, configurations that are same as or similar to those of the exterior body 3 and the exterior-covered wire harness 1 of the first embodiment of the present disclosure are denoted by the same reference numerals as those of the exterior body 3 and the exterior-covered wire harness 1 and the description thereof is omitted. Only different configurations will be described.

As shown in FIG. 5, the exterior-covered wire harness 101 of the second embodiment of the present disclosure includes a wire harness 102 in which a plurality of electric wires are bundled, and an exterior body 103 to be mounted on the outer periphery of the wire harness 102. In the exterior-covered wire harness 101, corresponding to the fact that the wire harness 102 is routed by being bent along an extending direction X1, the wire exterior body 103 is formed by being bent along the extending direction X1 of the wire harness 102.

Next, the exterior body 103 of the second embodiment of the present disclosure will be described with referent to FIGS. 5 to 7. FIG. 6 is a plan view illustrating the exterior body 103, shown in FIG. 5, in a developed state. FIG. 7 is an enlarged plan view of bent portions 150a and 150b shown in FIG. 6. Note that FIGS. 6 and 7 show a state where the outer surface of the exterior body 103 shown in FIG. 5 is developed.

As shown in FIG. 5, the exterior body 103 includes a plurality of wall parts 104 extending along the extending direction X1 of the wire harness 102. The space formed by being surrounded by the wall parts 104 forms an accommodating part 105 that accommodates the wire harness 102.

Figure 6:
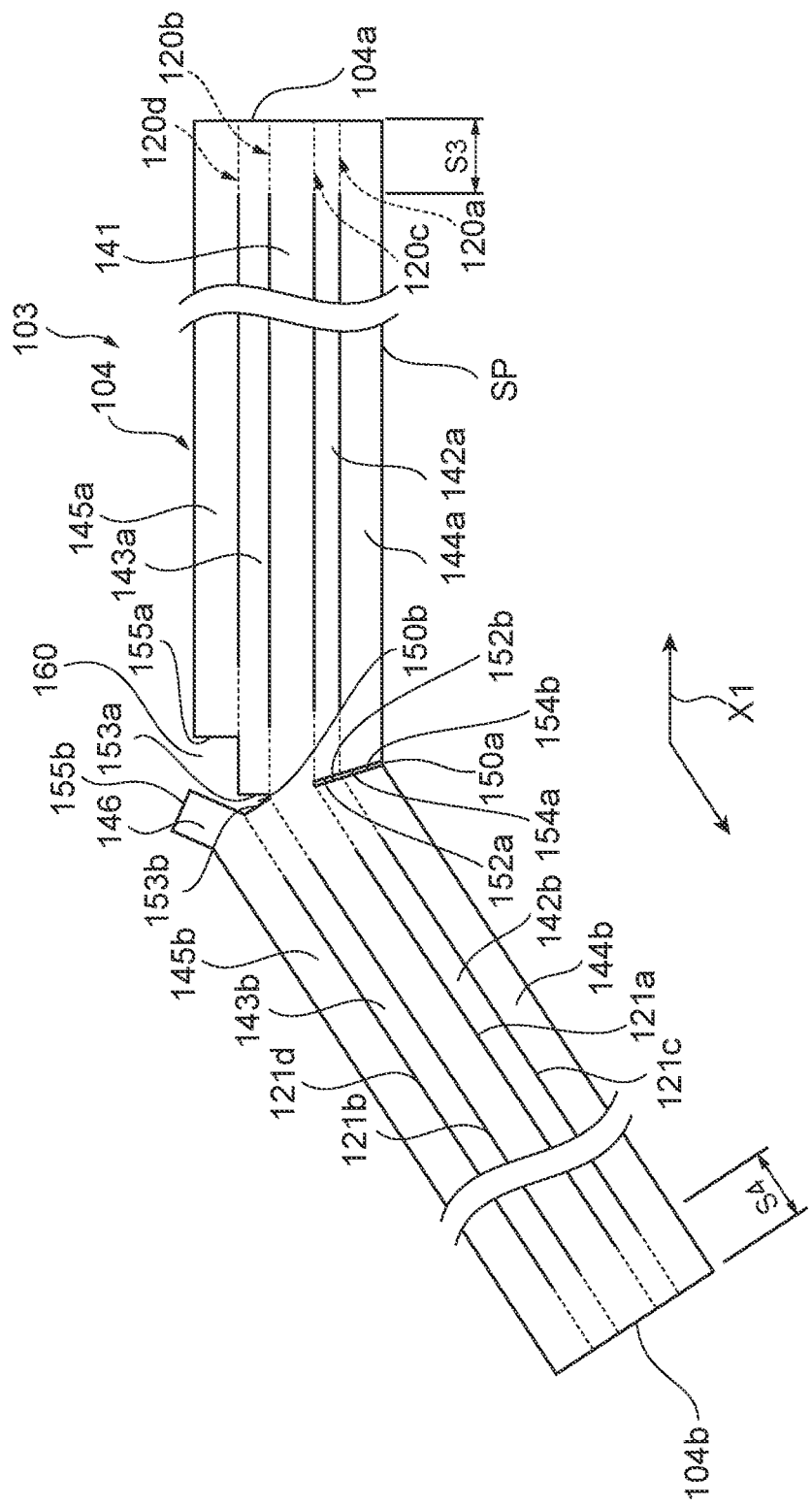
FIG. 6 A plan view showing the exterior body, in a developed state, of the second embodiment of the present disclosure.

As shown in FIGS. 5 and 6, the wall parts 104 are integrally formed by bending one resin sheet SP at the bending portions 120a to 120d. That is, the resin sheet SP is bent at bending portions 120a to 120d to form the wall parts 104.

The wall parts 104 include a bottom wall part 141, a side wall part 142 provided continuously from an edge of the bottom wall part 141 via the bending portion 120a, a side wall part 143 provided continuously from an edge of the bottom wall part 141 via the bending portion 120b, an inner lid wall part 144 provided continuously from the tip of the side wall part 142 via the bending portion 120c, and an outer lid wall part 145 provided continuously from the tip of the side wall part 143 via the bending portion 120d. Further, the wall parts 104 include bent portions 150a and 150b with a predetermined bent angle, corresponding to the wire harness 102 that is routed while being bent along the extending direction X1.

The bottom wall part 141 is disposed between the side wall part 142 and the side wall part 143, the side wall part 142 is erected from an edge of the bottom wall part 141 via the bending portion 120a, and the side wall part 143 is erected from an edge of the bottom wall part 141 via the bending portion 120b. The bottom wall part 141 extends integrally from one end portion 104a to another end portion 104b in the extending direction X1 of the wire harness 102 of the exterior body 103. That is, the bottom wall part 141 is provided along the extending direction X1 of the wire harness 102 over the bent portions 150a and 150b.

As illustrated in FIG. 6, the side wall part 142 is divided into a first portion 142a and a second portion 142b with a bent portion 150a being the boundary, in order to form the bent portion 150a in the exterior body 103. The first portion 142a and the second portion 142b are adjacent to each other with the bent portion 150a being the boundary. In both the first portion 142a and the second portion 142b, division ends 152a and 152b are located at the bent portion 150a. The first portion 142a extends from the one end portion 104a to the division end 152a, and the second portion 142b extends from the other end portion 104b to the division end 152b.

The side wall part 143 is divided into a first portion 143a and a second portion 143b with a bent portion 150b being the boundary, in order to form the bent portion 150b in the exterior body 103. The first portion 143a and the second portion 143b are adjacent to each other with the bent portion 150b being the boundary. In both the first portion 143a and the second portion 143b, division ends 153a and 153b are located at the bent portion 150b. The first portion 143a extends from the one end portion 104a to the division end 153a, and the second portion 143b extends from the other end portion 104b to the division end 153b.

The inner lid wall part 144 is divided into a first portion 144a and a second portion 144b with the bent portion 150a being the boundary, in order to form the bent portion 150a in the exterior body 103. The first portion 144a and the second portion 144b are adjacent to each other with the bent portion 150a being the boundary. In both the first portion 144a and the second portion 144b, division ends 154a and 154b are located at the bent portion 150a. The first portion 144a extends from the one end portion 104a to the division end 154a, and the second portion 144b extends from the other end portion 104b to the division end 154b. Further, as shown in FIG. 5, the inner lid wall part 144 extends almost parallel to the bottom wall part 141 from the side wall part 142 to the side wall part 143 or to the vicinity of the side wall part 143.

The outer lid wall part 145 faces the bottom wall part 141, and is divided between the one end portion 104a of the exterior body 103 and the bent portions 150a and 150b to form a boundary portion 160. That is, the outer lid wall part 145 is separated into a first portion 145a and a second portion 145b with the boundary portion 160 being the boundary. Further, the first portion 145a and the second portion 145b are adjacent to each other with the boundary portion 160 being the boundary. As shown in FIG. 6, in both the first portion 145a and the second portion 145b, boundary ends 155a and 155b are located at the boundary portion 160. The boundary ends 155a and 155b are located between the one end portion 104a and the bent portions 150a and 150b. Further, as shown in FIG. 5, the first portion 145a extends from the one end portion 104a to the boundary portion 160 and the second portion 145b extends from the other end portion 104b to the boundary portion 160, and they are formed to be bent at an angle corresponding to the bent portions 150a and 150b.

As shown in FIGS. 5 and 6, in the second portion 145b of the outer lid wall part 145, an area from the bent portions 150a and 150b to the boundary end 155b overlaps a partial area of the first portion 144a of the inner lid wall part 144 in a planar view to thereby form a wall-surface overlapping portion 146. Moreover, in the wall-surface overlapping portion 146, the second portion 145b of the outer lid wall part 145 is joined to the first portion 144a of the inner lid wall part 144 by a joining means 170.

To the bent portion 150a, the division ends 152a and 152b of the first portion 142a and the second portion 142b of the side wall part 142 are disposed at a predetermined angle. Further, to the bent portion 150b, the division ends 153a and 153b of the first portion 143a and the second portion 143b of the side wall part 143 are disposed at a predetermined angle. Then, the wall parts 104 are formed to be in shapes along the extending direction X1 of the wire harness 102 by being bent at a predetermined angle by the bent portion 150a and the bent portion 150b.

Figure 7:
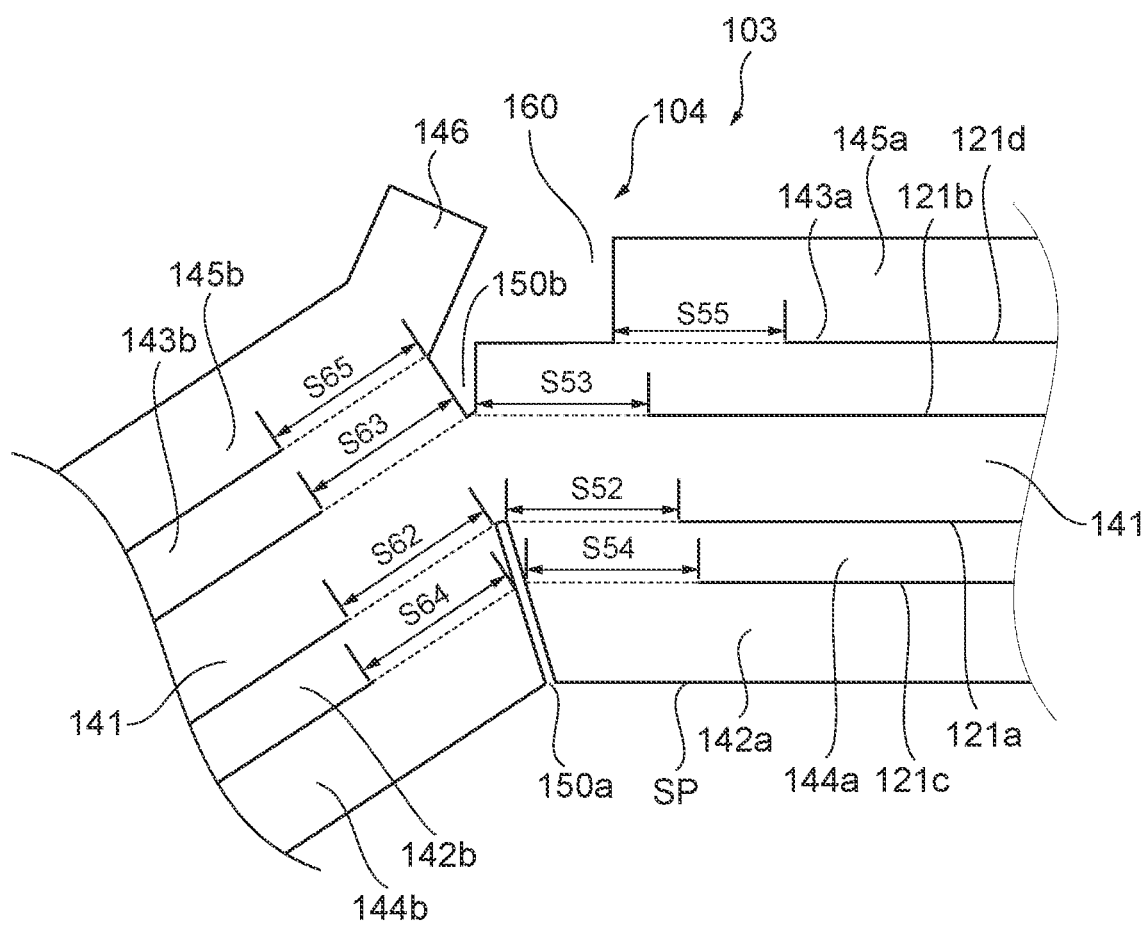
FIG. 7 An enlarged plan view showing a bent portion of the exterior body of the second embodiment of the present disclosure.

As shown in FIGS. 6 and 7, the bending portions 120a to 120d have grooves 121a to 121d respectively in which the thickness of the resin sheet SP is reduced. The grooves 121a to 121d are half-cut portions in which notches are formed along the bending portions 120a to 120d, respectively.

As shown in FIG. 6, the grooves 121a to 121d are respectively formed in a linear shape or an almost linear shape along the bending portions 20a to 20d at a position separated by a space S3 from the one end portion 104a and separated by a space S4 from the other end portion 4b, of the wall part 104. Further, as shown in FIG. 7, the grooves 121a to 121d are respectively formed in a linear shape or an almost linear shape along the bending portions 120a to 120d at positions separated by spaces S52 and S54 from the bent portion 150a, by a space S53 from the bent portion 150b, by a space S55 from the boundary portion 160, by spaces S62 and S64 from the bent portion 150a, and by spaces S63 and S65 from the bent portion 150b.

Specifically, the groove 121a is formed in the bending portion 120a except for the bending portion 120a in the spaces S3, S4, S52, and S62. The groove 121b is formed in the bending portion 120b excluding the bending portion 120b in the spaces S3, S4, S53, and S63. The groove 121c is formed in the bending portion 120c excluding the bending portion 120c in the spaces S3, S4, S54, and S64. The groove 121d is formed in the bending portion 120d excluding the bending portion 120d in the spaces S3, S4, S55, and S65. That is, the grooves 121a to 121d are not formed in the bending portions 120a to 120d in the space S3, the bending portions 120a to 120d in the space S4, the spaces S52, S53, S54, and S55, and the spaces S62, S63, S64, and S65.

Next, a method of forming the exterior body 103 described above and a method of forming the exterior-covered wire harness 101 by mounting the wire harness 102 to the exterior body 103 will be described with reference to FIGS. 5 to 7.

In the method of forming the exterior body 103, first, stamping is performed to stamp out a portion corresponding to the exterior body 103 from the resin sheet SP serving as a base material for forming the exterior body 103.

Further, in the stamped-out portion corresponding to the exterior body 103, half-cut molding is performed on the portions corresponding to the grooves 121a to 121d. Through the half-cut molding, the grooves 121a to 121d are formed, and good bending processability is provided to the bending portions 120a to 120d, whereby the accuracy in the bending positions is improved.

In the method of mounting the exterior body 103, formed as described above, on the wire harness 102, first, the resin sheet SP cut out of the base material is bent at the bending portions 120a and 120b such that the side wall parts 142 and 143 become almost perpendicular to the bottom wall part 141. When the bending portions 120a and 120b are bent, the space between the side wall part 142 and the side wall part 143 opens upward along the longitudinal direction X1.

After the resin sheet is bent at the bending portions 120a and 120b and the wire harness 102 is placed on the bottom wall part 141, the first portion 144a and the second portion 144b of the inner lid wall part 144 are bent at the bending portion 120c such that the first portion 144a and the second portion 144b of the inner lid wall part 144 become almost parallel to the bottom wall part 141.

Thereafter, the second portion 145b of the outer lid wall part 145 is bent at the bending portion 120d such that the first portion 145a of the outer lid wall part 145 becomes almost parallel to the bottom wall part 141. When the second portion 145b of the outer lid wall part 145 is bent at the bending portion 120d, the area from the bent portions 150a and 150b to the boundary portion 160, in the second portion 145b of the outer lid wall part 145, overlaps a partial area of the first portion 144a of the inner lid wall part 144, whereby the wall-surface overlapping portion 146 is formed.

Thereafter, the first portion 145a of the outer lid wall part 145 is bent at the bending portion 120d such that the first portion 145a of the outer lid wall part 145 becomes almost parallel to the bottom wall part 141. When the first portion 145a of the outer lid wall part 145 is bent at the bending portion 120d, it is divided between the one end portion 104a of the exterior body 103 and the bent portions 150a and 150b to thereby form the outer lid wall part 145 in which the boundary portion 160 is formed. That is, when the outer lid wall part 145 is bent at the bending portion 120d, the opening between the end portions of the side wall parts 142 and 143 is closed to form the accommodating part 105, and the wire harness 102 is accommodated in the accommodating part 105 in an inserted state. Further, the inner lid wall part 144 and the outer lid wall part 145 are joined to each other by the joining means 170, whereby a state where the opening between the side wall part 142 and the side wall part 143 is closed is fixed, so that the exterior body 103 is mounted on the outer periphery of the wire harness 102.

As described above, according to the exterior body 103 and the exterior-covered wire harness 101 according to the second embodiment of the present disclosure, the grooves 121a to 121d are formed from a position separated by the space S3 from the one end portion 104a of the wall part 104 up to a position separated by the space S4 from the other end portion 104b of the wall part 104. Therefore, advantageous effects similar to those of the exterior body 3 and the exterior-covered wire harness 1 of the first embodiment of the present disclosure can be achieved.

In particular, according to the exterior body 103 and the exterior-covered wire harness 101 according to the second embodiment of the present disclosure, the grooves 121a to 121d are formed along the bending portions 120a to 120d at positions separated by predetermined spaces (S52, S53, S54, S55, S62, S63, S64, S65) from the bent portions 150a and 150b bent at predetermined degrees or the boundary portion 160. That is, in the bending portions 120a to 120d in the predetermined spaces, the grooves 121a to 121d are not formed. Therefore, even if stress is applied near the bent portions 150a and 150b, it is possible to suppress the resin sheet SP from being torn and the exterior body 103 and the exterior-covered wire harness 101 from being broken.

Note that in the second embodiment described above, the wall parts 104 have bent portions 150a and 150b in the extending direction X1 of the wire harness 102. Instead, the wall parts may include a branch portion where the wire harness is split into one or more in the extending direction of the wire harness, or may include both a bent portion and a branch portion.

Figure 8A:
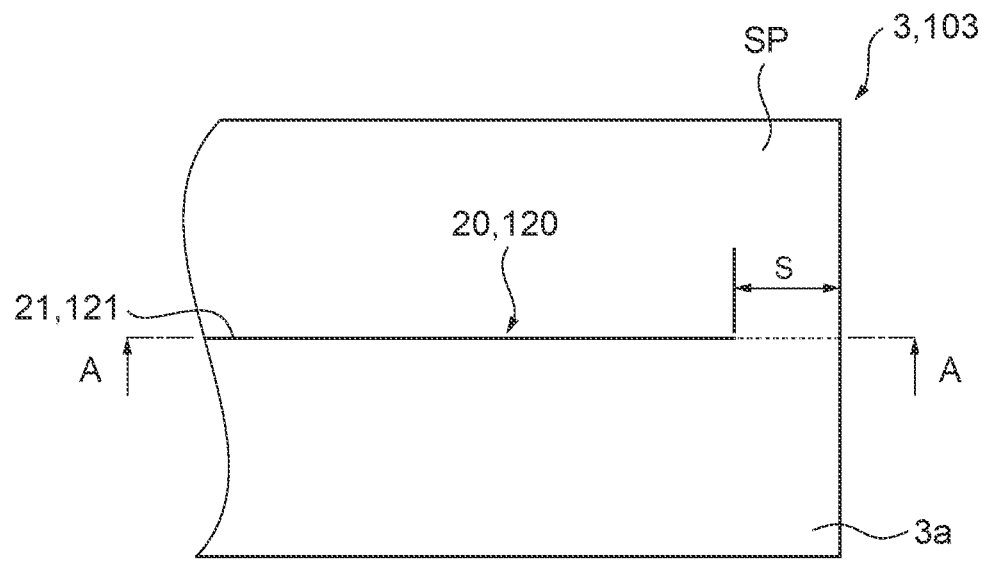
FIG. 8A and FIG. 8B Enlarged plan views of a bending portion of an exterior body of an embodiment of the present disclosure.
Figure 8B:
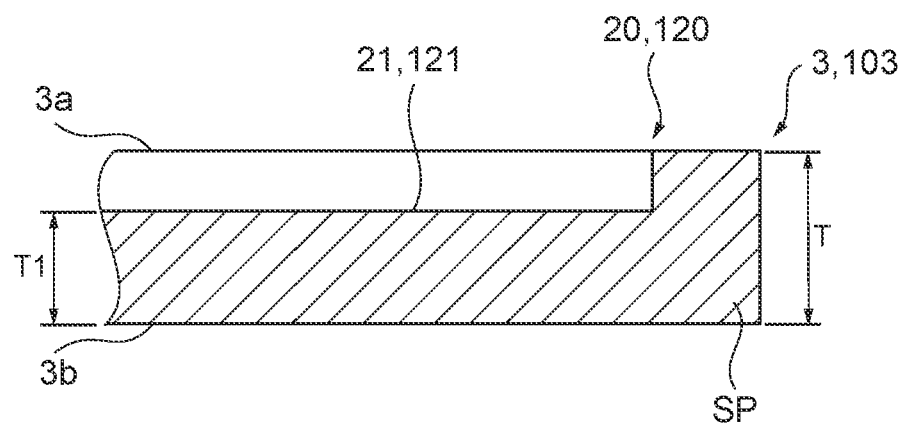
Figure 9A:
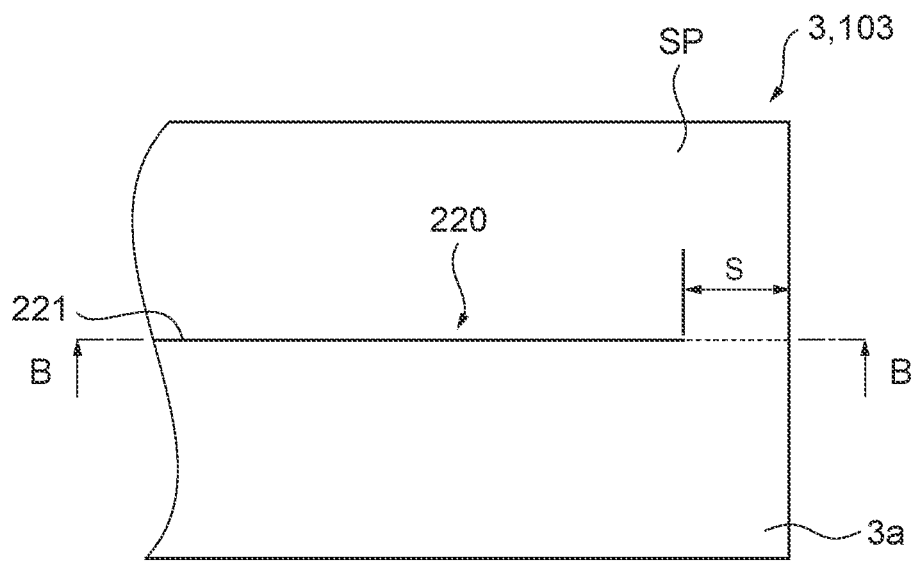
FIG. 9A and FIG. 9B Enlarged plan views for explaining a first modification of a bending portion of an exterior body of an embodiment of the present disclosure.

Thereafter, modifications of the first embodiment and the second embodiment of the present disclosure will be described with referent to FIGS. 8A and 8B to FIG. 10A and 10B. First, a first modification of the bending portions 20 (20a to 20d) and 120 (120a to 120d) of the embodiments of the present disclosure will be described with reference to FIG. 8A and FIG. 8B and FIG. 9A and FIG. 9B. FIG. 8A is an enlarged plan view showing the bending portion 20, 120 of the embodiment of the present disclosure, and FIG. 8B is a cross-sectional view taken along line A-A of FIG. 8A. FIG. 9A is an enlarged plan view showing a first modification of a bending portion of the embodiment of the present disclosure, and FIG. 9B is a cross-sectional view taken along line B-B of FIG. 9A.

As shown in FIGS. 8A and 8B, in the first embodiment and the second embodiment, description has been given on the case where the grooves 21 and 121, formed in the bending portions 20 and 120 of the exterior bodies 3 and 103, are half-cut portions in which the thickness T of the resin sheet SP is reduced. However, as shown in FIGS. 9A and 9B, the grooves formed in the bending portion 220 of the exterior bodies 3 and 103 may be a groove 221 in which the thickness T of the resin sheet SP is not reduced.

Specifically, in the first embodiment and the second embodiment, as shown in FIG. 8B, each of the grooves 21 and 121 has a shape dented from the upper surface 3a to the lower surface 3b of the resin sheet of each of the exterior body 3 and 103, and the thickness T1 of the resin sheet SP of the groove 21 and 121 is thinner than the thickness T of the resin sheet SP except for the grooves 21 and 121 (T>T1).

Figure 9B:
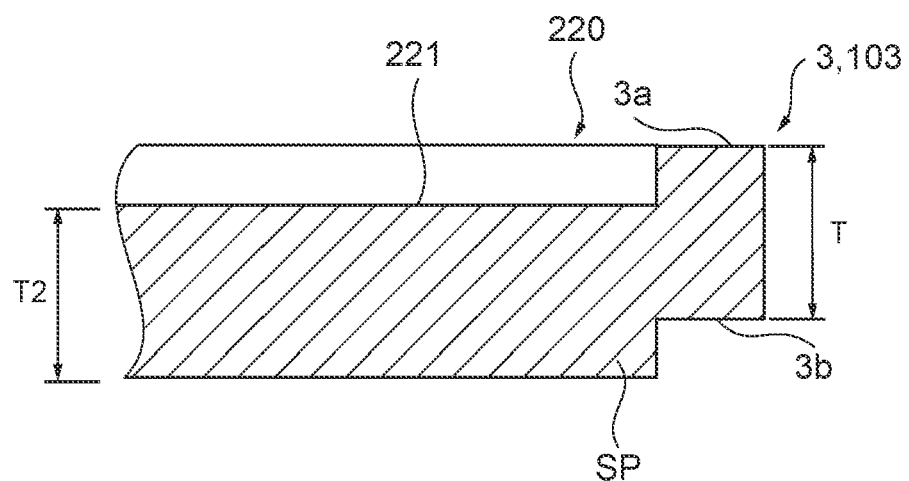

On the other hand, as shown in FIG. 9B, the groove 221 has a shape dented from the upper surface 3a to the lower surface 3b of the resin sheet SP of each of the exterior bodies 3 and 103, and the lower surface 3b protrudes downward by the dent of the upper surface 3a. That is, the thickness T2 of the resin sheet SP of the groove 221 is almost the same as the thickness T of the resin sheet SP except for the groove 221 (T=T2). As described above, the groove formed in the exterior bodies 3 and 103 is not limited to one in which the thickness T of the resin sheet SP is reduced, but may be a groove in which the thickness T of the resin sheet SP is not reduced.

Figure 10A:
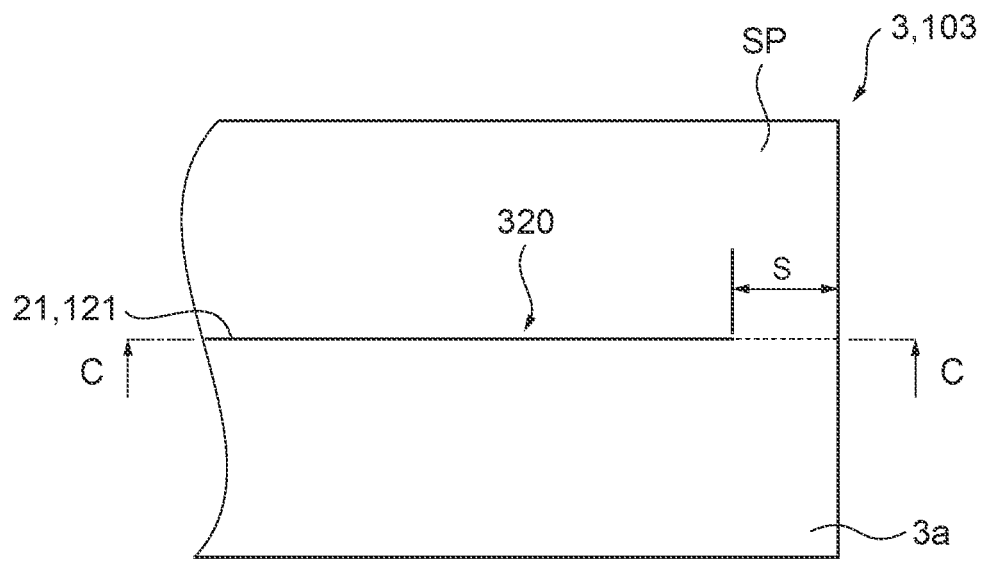
FIG. 10A and FIG. 10B Enlarged plan views for explaining a second modification of a bending portion of an exterior body of an embodiment of the present disclosure.
Figure 10B:
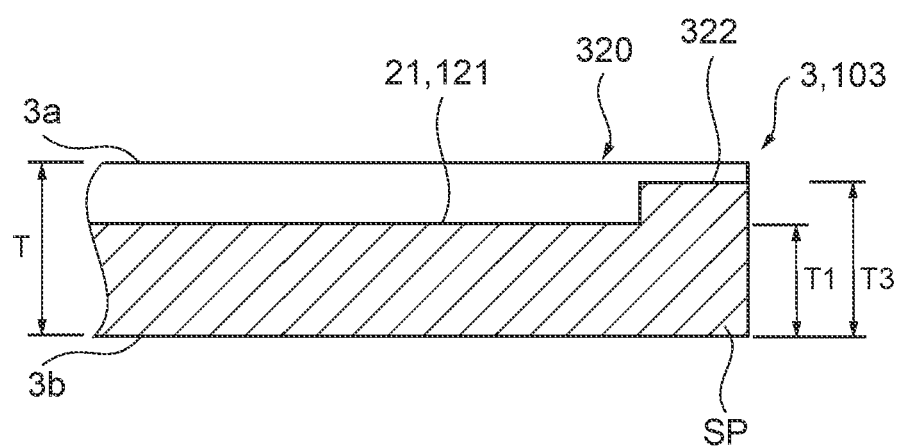

Next, a second modification of the bending portions 20 (20a to 20d) and 120 (120a to 120d) of the embodiments of the present disclosure will be described with reference to FIGS. 8A and 8B and 10A and 10B. FIG. 10A is an enlarged plan view showing a second modification of a bending portion of the embodiment of the present disclosure, and FIG. 10B is a cross-sectional view taken along line C-C of FIG. 10A.

As shown in FIGS. 8A and 8B, in the first embodiment and the second embodiment, description has been given on the case where the grooves 21 and 121 are formed in the bending portions 20 and 120 of the exterior bodies 3 and 103, and the grooves 21 and 121 are formed in the bending portions 20 and 120 except for the bending portions 20 and 120 in a predetermined space S from end portions of the wall parts 4 and 104. However, as shown in FIGS. 10A and 10B, a groove 322 may also be formed in a bending portion 320 in the space S.

That is, the grooves 21 and 121 and the groove 322 may be formed such that the heights in the thickness direction of the resin sheet SP differ from each other in the bending portions 20 and 120 at positions separated by the predetermined spaces S1 and S3 from the one end portions 4a and 104a and the predetermined spaces S2 and S4 from the other end portions 4b and 104b in the extending direction (longitudinal direction X) of the electric wires of the wall parts 4 and 104 and the bending portions 20 and 120 at positions accommodated between the predetermined spaces S1 and S3 from the one end portions 4a and 14a and the predetermined spaces S2 and S4 from the other end portions 4b and 104b (see FIGS. 2 and 6).

Further, grooves may be formed such that the heights in the thickness direction of the resin sheet SP differ from each other in the bending portion 120 except for the spaces S52, S53, S54, S55 and the spaces S62, S63, S64, S65, and the bending portions 120 in the spaces S52, S53, S54, S55 and the space S62, S63, S64, S65 (see FIG. 7).

Specifically, in the first embodiment and the second embodiment, as shown in FIG. 8B, the grooves 21 and 121 are formed in the bending portions 20 and 120 excluding the bending portions 20 and 120 in the space S, and no groove is formed in the bending portions 20 and 120 in the space S.

On the other hand, as shown in FIG. 10B, in the bending portion 320 except for the bending portion 320 in the space S, 21 and 121 in which the thickness T of the resin sheet SP is reduced are formed, and even in the bending portion 320 in the space S, the groove 322 in which the thickness T of the resin sheet SP is reduced is formed. Specifically, a thickness T3 of the resin sheet SP of the groove 322 is thinner than the thickness T of the resin sheet SP (T>T3), and is thicker than the thickness T1 of the resin sheet SP of the grooves 21 and 121 (T1<T3). Therefore, in the bending portion 320 except for the bending portion 320 in the space S and the bending portion 320 in the space S, the heights in the thickness direction of the resin sheet SP differ from each other and a step is formed on the surface of the resin sheet SP. As described above, the groove 322 may be formed even in the bending portion 320 in the space S.

Note that the groove 322 in the bending portion 320 in the space S is not limited to the case where it is a half-cut portion in which a notch is made in advance along the bending portion 320. For example, the groove 322 may be formed in the case where the groove 322 is not formed in the space S of the bending portion 320 but the thickness of the resin sheet SP is reduced when the bending portion 320 is bent and then released or returned to the position before bending.

In the first embodiment and the second embodiment, description has been given on the case where the grooves 21a to 21d and 121a to 121d are half-cut portions in which notches are made along the bending portions 20a to 20d and 120a to 120d. However, the grooves may be extrusion-molded portions formed by extrusion molding. In the case where the grooves 21a to 21d and 121a to 121d are extrusion-molded portions, it is preferable that they are high-density portions in which the density of the grooves 21a to 21d and 121a to 121d is higher than the density of the wall parts 4 and 104 excluding the grooves 21a to 21d and 121a to 121d. Specifically, from the viewpoint of obtaining bending processability of the bending portions 20a to 20d and 120a to 120d while stably maintaining the shape of the exterior bodies 3 and 103, it is preferable that the density of the resin sheet SP in the grooves 21a to 21d and 121a to 121d is 400 Kg/m$^3$ or more and 1200 Kg/m$^3$ or less, and it is particular preferable that the density is 500 Kg/m$^3$ or more and 1200 Kg/m$^3$ or less. Note that the density of the grooves 21a to 21d and 121a to 121d of the resin sheet SP is measured on the basis of JIS K 7222, by returning the bent resin sheet SP to be flat and cutting off a width of 1 mm on both sides from the portions of the grooves 21a to 21d and 121a to 121d.

While preferred embodiments of the present disclosure have been described above, the present disclosure is not limited to the exterior bodies 3 and 103 and the exterior-covered wire harnesses 1 and 101 according to the embodiments described above, and includes every aspect included in the spirit of the present disclosure and the scope of the claims. Also, respective configurations may be selectively combined as appropriate so as to achieve at least part of the object and effect described above. For example, shapes, materials, arrangement, size, and the like of the respective constituent elements in the embodiments described above can be changed as appropriate according to specific used aspects of the present disclosure. The configurations of the respective parts can be replaced with any configurations having similar functions.

Description has been given on the case where the grooves 21*a* to 21*d* and 121*a* to 121*d* in the embodiments of the present disclosure described above are formed in the bending portions 20*a* to 20*d* and 120*a* to 120*d*. However, a groove may be formed in at least one bending portion of the bending portions 20*a* to 20*d*, or a groove may be formed in at least one bending portion of the bending portions 120*a* to 120*d*. The number of grooves formed in a bending portion can be changed appropriately.

Further, description has been given on the case where the grooves 21*a* to 21*d* and 121*a* to 121*d* in the embodiments of the present disclosure described above are formed in a linear shape or an almost linear shape along the bending portions 20*a* to 20*d* and 120*a* to 120*d*. However, grooves may be formed at predetermined spaces along the bending portions 20*a* to 20*d* and 120*a* to 120*d*. Further, the grooves 21*a* to 21*d* and 121*a* to 121*d* may be formed in the shape of a broken line or a dotted line along the bending portions 20*a* to 20*d* and 120*a* to 120*d*. That is, the shape of the grooves 21*a* to 21*d* and 121*a* to 121*d* can be changed appropriately.

Further, description has been given on the case where the grooves 21*a* to 21*d* and 121*a* to 121*d* of the embodiments of the present disclosure described above are half-cut portions in which notches are made along the bending portions 20*a* to 20*d* and 120*a* to 120*d*. However, the forming method can be changed appropriately if they are portions in which the thickness of the resin sheet SP is reduced.

Furthermore, description has been given on the case where in the accommodating part 5 in the embodiments of the present disclosure described above, a cross-sectional area in the short direction Y of the exterior body 3 is identical or almost identical in any part in the longitudinal direction X. However, the accommodating parts 5 and 105 may have a radius that is expanded or reduced along the shape of the wire harnesses 2 and 102.

LIST OF REFERENCE SIGNS

1, 101 exterior-covered wire harness
2 wire harness
3, 103 exterior body
4, 104 wall part
5, 105 accommodating part
20 (20*a*, 20*b*, 20*c*, 20*d*) bending portion
120 (120*a*, 120*b*, 120*c*, 120*d*) bending portion
220, 320 bending portion
21 (21*a*, 21*b*, 21*c*, 21*d*) groove
121 (121*a*, 121*b*, 121*c*, 121*d*) groove
221, 322 groove
41, 141 bottom wall part
42, 43, 142, 143 side wall part
44, 144 inner lid wall part
45, 145 outer lid wall part
S, S1, S2 space
S52, S53, S54, S55 space
S62, S63, S64, S65 space
X longitudinal direction
Y short direction

The invention claimed is:

1. A wire exterior body to be mounted on an outer periphery of an electric wire, the wire exterior body being formed of a resin sheet, the wire exterior body comprising:
a bending portion at which the resin sheet is bent; and
a plurality of wall parts formed of the resin sheet bent at the bending portion, the plurality of the wall parts extending along an extending direction of the electric wire and forming an accommodating part that accommodates the electric wire, wherein
a groove is formed in the bending portion at a position separated by a predetermined space from an end portion, in the extending direction of the electric wire, of the wall parts,
the predetermined space which is located on the wall parts extends along the extending direction of the electric wire, the groove extending along the extending direction of the electric wire is not formed in the predetermined space.

2. The wire exterior body according to claim 1, wherein the plurality of the walls include a branch portion and/or a bent portion in the extending direction of the electric wire, and at least one wall part of the plurality of the wall parts is divided at the branch portion and/or the bent portion, and
the groove is formed in the bending portion at a position separated by a predetermined space from a division end at which the at least one wall part is divided.

3. The wire exterior body according to claim 2, wherein the predetermined space is 1 mm or more and 10 mm or less.

4. The wire exterior body according to claim 3, wherein the groove is formed in a linear shape or an almost linear shape along the extending direction of the electric wire.

5. The wire exterior body according to claim 2, wherein the groove is formed in a linear shape or an almost linear shape along the extending direction of the electric wire.

6. The wire exterior body according to claim 2, wherein a depth of the groove is 30% or more and 80% or less of a thickness of the resin sheet.

7. The wire exterior body according to claim 2, wherein a density of the resin sheet in the groove is higher than a density of the resin sheet except for the groove in an upper surface and a lower surface facing a thickness direction of the resin sheet, and is 400 Kg/m3 or more and 1200 Kg/m3 or less.

8. The wire exterior body according to claim 2, wherein the bending portion at the position separated by the predetermined space from the end portion, in the extending direction of the electric wire, of the wall part and the bending portion at a position in the predetermined space from the end portion in the extending direction of the electric wire have different heights in a thickness direction of the resin sheet.

9. The wire exterior body according to claim 1, wherein the predetermined space is 1 mm or more and 10 mm or less.

10. The wire exterior body according to claim 9, wherein the groove is formed in a linear shape or an almost linear shape along the extending direction of the electric wire.

11. The wire exterior body according to claim 9, wherein a depth of the groove is 30% or more and 80% or less of a thickness of the resin sheet.

12. The wire exterior body according to claim 9, wherein a density of the resin sheet in the groove is higher than a density of the resin sheet except for the groove in an upper surface and a lower surface facing a thickness direction of the resin sheet, and is 400 Kg/m3 or more and 1200 Kg/m3 or less.

13. The wire exterior body according to claim 9, wherein the bending portion at the position separated by the predetermined space from the end portion, in the extending direction of the electric wire, of the wall part and the bending portion at a position in the predetermined space from the end portion in the extending direction of the electric wire have different heights in a thickness direction of the resin sheet.

14. The wire exterior body according to claim 1, wherein the groove is formed in a linear shape or an almost linear shape along the extending direction of the electric wire.

15. The wire exterior body according to claim 14, wherein a depth of the groove is 30% or more and 80% or less of a thickness of the resin sheet.

16. The wire exterior body according to claim 14, wherein a density of the resin sheet in the groove is higher than a density of the resin sheet except for the groove in an upper surface and a lower surface facing a thickness direction of the resin sheet, and is 400 Kg/m3 or more and 1200 Kg/m3 or less.

17. The wire exterior body according to claim 1, wherein a depth of the groove is 30% or more and 80% or less of a thickness of the resin sheet.

18. The wire exterior body according to claim 1, wherein a density of the resin sheet in the groove is higher than a density of the resin sheet except for the groove in an upper surface and a lower surface facing a thickness direction of the resin sheet, and is 400 Kg/m3 or more and 1200 Kg/m3 or less.

19. The wire exterior body according to claim 1, wherein the bending portion at the position separated by the predetermined space from the end portion, in the extending direction of the electric wire, of the wall part and the bending portion at a position in the predetermined space from the end portion in the extending direction of the electric wire have different heights in a thickness direction of the resin sheet.

20. An exterior-covered wire harness comprising:
a wire harness; and
the wire exterior body according to claim 1, wherein the wire exterior body is mounted on an outer periphery of the wire harness.

\* \* \* \* \*